United States Patent
Ulander et al.

(10) Patent No.: US 10,225,006 B1
(45) Date of Patent: Mar. 5, 2019

(54) METHOD FOR TRANSMITTING AN FSOC SUPERVISOR CHANNEL

(71) Applicant: X Development LLC, Mountain View, CA (US)

(72) Inventors: Klaus Ulander, Livermore, CA (US); Howard Tran, San Ramon, CA (US); Robert Steinkraus, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 15/959,805

(22) Filed: Apr. 23, 2018

(51) Int. Cl.
*H04B 10/077* (2013.01)
*H04B 10/11* (2013.01)
*H04B 10/60* (2013.01)
*H04B 10/50* (2013.01)

(52) U.S. Cl.
CPC .......... *H04B 10/077* (2013.01); *H04B 10/11* (2013.01); *H04B 10/50* (2013.01); *H04B 10/60* (2013.01)

(58) Field of Classification Search
CPC ...... H04B 10/077; H04B 10/11; H04B 10/50; H04B 10/60
See application file for complete search history.

(56) References Cited

U.S. PATENT DOCUMENTS

| | | | |
|---|---|---|---|
| 6,323,980 B1* | 11/2001 | Bloom | H04B 10/1125 398/116 |
| 6,347,001 B1* | 2/2002 | Arnold | H04B 10/118 398/122 |
| 7,609,972 B2 | 10/2009 | Cunningham et al. | |
| 9,680,565 B2 | 6/2017 | Miniscalco et al. | |
| 9,729,234 B2 | 8/2017 | Lambert | |
| 9,813,151 B2* | 11/2017 | Kingsbury | H04B 10/118 |
| 9,826,292 B2* | 11/2017 | Coleman | H04B 10/118 |
| 2002/0131121 A1* | 9/2002 | Jeganathan | H04B 10/1127 398/128 |
| 2004/0120719 A1* | 6/2004 | Andreu-von Euw | H04B 10/1127 398/131 |

* cited by examiner

*Primary Examiner* — Dalzid E Singh
(74) *Attorney, Agent, or Firm* — Lerner, David, Littenberg, Krumholz & Mentlik, LLP

(57) ABSTRACT

Aspects of the disclosure provide for a method of transmitting state information using free-space optical communication. The method includes using one or more processors of a first communication device to collect state information of the first communication device. A supervisor signal that carries the state information is transmitted from the first communication device along with a beacon beam in a first solid angle. The supervisor signal is a frequency different from the one or more frequencies of the beacon beam. When a communication link is established between the first communication device and a second communication device, a plurality of data packets is transmitted from the first communication device to the second communication device in a second solid angle smaller than the first solid angle. A subset of the plurality of data packets that do not carry client data carries the state information of the first communication device.

20 Claims, 4 Drawing Sheets

200

METHOD FOR TRANSMITTING AN FSOC SUPERVISOR CHANNEL

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

BRIEF SUMMARY

Aspects of the disclosure provide for a method of transmitting state information using free-space optical communication. The method includes using one or more processors of a first communication device to collect state information of the first communication device and transmit, using a beacon transmitter of the first communication device, a beacon beam and a supervisor signal in a first solid angle. The beacon beam is one or more first frequencies, and the supervisor signal is a second frequency different from the one or more first frequencies and carries the state information. When a communication link is established between the first communication device and a second communication device, a communication link transmitter of the first communication device may be used to transmit a plurality of data packets to the second communication device in a second solid angle smaller than the first solid angle. A first subset of the plurality of data packets carries client data, and a second subset of the plurality of data packets carries the state information of the first communication device.

In one example, the method also includes performing an adjustment of the second communication device using the state information of the first communication device. Performing the adjustment of the second communication device optionally includes updating a pointing direction of the second communication device based on a location or pointing direction included the state information of the first communication device. In addition or alternatively, performing the adjustment of the second communication device includes updating transmission specifications based on system requirements included in the state information of the first communication device.

In another example, the method also includes receiving state information from the second communication device and performing an adjustment of the first communication device using the state information of the second communication device. The one or more first frequencies are optionally 150 Hz or less and the second frequency is greater than 150 Hz. In an additional example, the first solid angle covers an angular area on the order of a square milliradian, and the second solid angle covers an angular area on an order of one hundredth of a square milliradian. The method additionally or alternatively includes switching, by the one or more processors, to transmitting state information in the supervisor signal using the beacon transmitter when the communication link is lost.

Other aspects of the disclosure provide for a system for transmitting state information using free-space optical communication. The system includes a beacon transmitter configured to transmit a beacon beam including one or more first frequencies in a first solid angle and a communication link transmitter configured to transmit a plurality of data packets. In addition, the system includes one or more processors configured to collect state information of a first communication device and transmit, using the beacon transmitter, supervisor signal along with the beacon beam in the first solid angle. The supervisor signal is a second frequency different from the one or more first frequencies and carries the state information. The one or more processors are also configured to transmit, using the communication link transmitter of the first communication device, the plurality of data packets to the second communication device in a second solid angle smaller than the first solid angle when a communication link is established between the first communication device and a second communication device. A first subset of the plurality of data packets carries client data, and a second subset of the plurality of data packets carries the state information of the first communication device.

In one example, the one or more processors are further configured to perform an adjustment of the second communication device using the state information of the first communication device. The one or more processors optionally are configured to perform the adjustment of the second communication device by updating a pointing direction of the second communication device based on a location or pointing direction included in the state information of the first communication device. Additionally or alternatively, the one or more processors are configured to perform the adjustment of the second communication device by updating transmission specifications based on system requirements included in the state information of the first communication device.

In another example, the one or more processors are also configured to receive state information from the second communication device and perform an adjustment of the first communication device using the state information of the second communication device. The one or more processors are also optionally configured to switch to transmitting the state information in the supervisor signal using the beacon transmitter when the communication link is lost.

Further aspects of the disclosure provide for a non-transitory, tangible computer-readable storage medium on which computer readable instructions of a program are stored. The instructions, when executed by one or more processors, cause the one or more processors to perform a method. The method includes collecting state information of a first communication device and transmitting, using a beacon transmitter of the first communication device, a beacon beam and a supervisor signal in a first solid angle. The beacon beam is one or more first frequencies, and the supervisor signal is a second frequency different from the one or more first frequencies and carries the state information. The method also includes transmitting, using a communication link transmitter of the first communication device, a plurality of data packets to the second communication device in a second solid angle smaller than the first solid angle when a communication link is established between the first communication device and a second communication device. A first subset of the plurality of data packets carries client data, and a second subset of the plurality of data packets carries the state information of the first communication device.

In one example, the method also includes performing an adjustment of the second communication device using the state information of the first communication device. The method also optionally includes performing the adjustment of the second communication device by updating a pointing direction of the second communication device based on a location or pointing direction included the state information of the first communication device. Additionally or alternatively, the method includes performing the adjustment of the second communication device by updating transmission specifications based on system requirements included in the state information of the first communication device.

In another example, the method also includes receiving state information from the second communication device and performing an adjustment of the first communication device using the state information of the second communication device. The method additionally or alternatively includes switching to transmitting state information in the supervisor signal using the beacon transmitter when the communication link is lost.

DETAILED DESCRIPTION

Overview

The technology relates to transferring state information between communication terminals in a communications system concurrently with either a beacon signal or a communication signal. Before a communication link between two communication terminals has been established, a beacon signal may be optically transmitted with a supervisor signal that carries state information encoded on it. Based on the state information, an adjustment may be made to the communication device of a given communication terminal. Once a communication link is established, state information may be optically transmitted in idle frames in the communication signal.

The features described herein may provide an optical communication system that quickly establishes, maintains, and reestablishes communication links. Transmitting state information of a given communication terminal with a beacon signal allows for another communication terminal that receives the state information to prepare for establishing a communication link with the given communication terminal earlier under coarsely aligned conditions. The received state information may also allow the other communication terminal to more accurately determine where to point in order to establish a communication link with the given communication terminal. After a communication link is established, the given communication terminal may transmit state information in idle frames in a communication signal, which may allow for quicker updates to the alignment of the other communication terminal with the given communication device.

Example Systems

Figure 1:
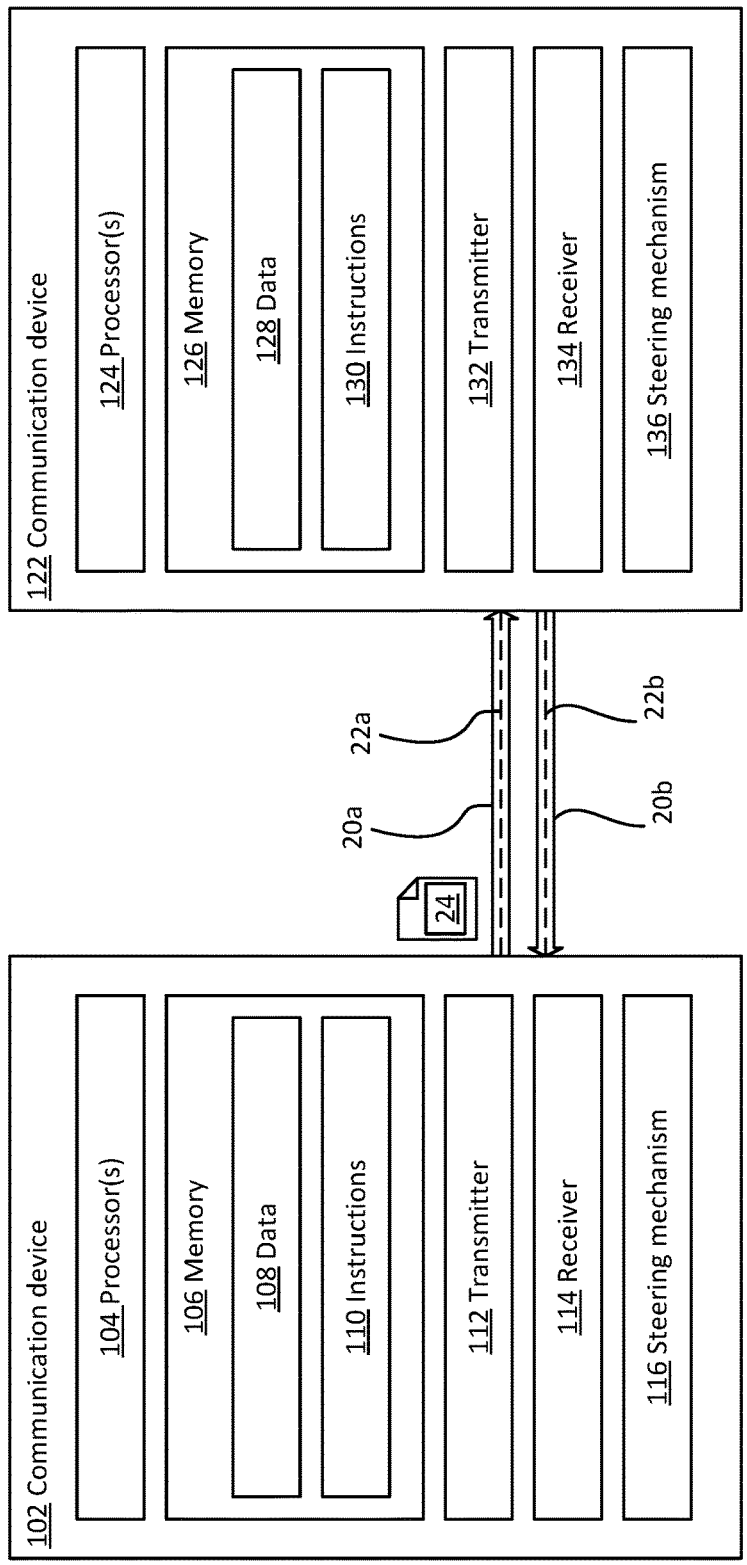
FIG. 1 is a functional diagram 100 of a first communication device and a second communication device in accordance with aspects of the disclosure.

FIG. 1 is a functional diagram 100 of a first communication device of a first communication terminal configured to form one or more links with a second communication device of a second communication terminal, for instance as part of a system such as a free-space optical communication (FSOC) system. For example, a first communication device 102 includes one or more processors 104, a memory 106, a transmitter 112, a receiver 114, and a steering mechanism 116.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, it will be understood that the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel. The one or more processors 104 may be used to collect and monitor state information of the first communication device 102. The state information may include, for example, a power level, pointing direction, geographic location, system requirements, or other type of information about the operation of the first communication device.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, the state information or updates to the state information collected by the one or more processors 104 may be stored.

Data 108 may be retrieved, stored or modified by the one or more processors 104 in accordance with the instructions 110. For instance, although the system and method is not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transmitter 112 and the receiver 114. Transmitter 112 and receiver 114 may be part of a transceiver arrangement in the communication device 102. The one or more processors 104 may therefore be configured to transmit, via the transmitter 112, data in a signal, and also may be configured to receive, via the receiver 114, communications and data in a signal. the received signal may be processed by the one or more processors 104 to extract the communications and data.

The transmitter 112 may be configured to output a beacon beam 20 that allows one communication device to locate another. The transmitter 112 may include a beacon transmitter The beacon beam may be output at a wider angle than the optical communication beam, allowing a communication device that receives the beacon beam to better locate the beacon beam. In other words, the beacon beam may cover a larger solid angle in space than the communication signal. For example, the beacon signal may cover an angular area on the order of a square milliradian, and the communication signal may cover an angular area on the order of a hundredth of a square milliradian.

The transmitter 112 may also be configured to transmit a communication signal over a communication link 22. In some examples, the communication signal may be a signal configured to travel through free space, such as, for example, a radio-frequency signal or optical signal. The transmitter 112 may include one or more communication link transmitters that are separate from the beacon transmitter. Alternatively, the transmitter 112 may include one transmitter configured to output both the beacon beam and the communication signal. In some implementations, a given communication link transmitter may include a semi-conductor device, such as, for example, a light-emitting diode (LED) or a laser diode. In some examples, the given communication link transmitter may include a fiber laser or a solid state laser. Laser diodes may be directly modulated, or in other words, the light output may be controlled by a current applied directly to the given communication link transmitter. The given communication link transmitter may include a single-mode laser diode that supports one optical mode, or the given communication link transmitter may include a multimode laser diode that supports multiple-transverse optical modes. The given communication link transmitter may receive a modulated communication signal from a modulator (not shown), which modulates a received electrical signal. The given communication link transmitter may then convert the modulated electrical signal into an optical communication beam that is configured to establish a communication link with another communication device, and then output the optical communication beam from the first communication device 102.

The transmitter 112 of the first communication device 102 may also be configured to output a beacon beam 20a to establish a communication link 22a with the second communication device 122, which receives the beacon beam 20a. The first communication device 102 may align the beacon beam 20a co-linearly with the optical communication beam (not shown) that has a narrower solid angle than the beacon beam and carries a communication signal 24. As such, when the second communication device 122 receives the beacon beam 20a, the second communication device 122 may establish a line-of-sight with the first communication device 102 or otherwise align with the first communication device. As a result, the communication link 22a that allows for the transmission of the optical communication beam (not shown) from the first communication device 102 to the second communication device 122 may be established.

The receiver 114 may include a tracking sensor configured to detect the optical beam and an optical fiber. In addition, the receiver 114 may also include a lens, mirror, or other system configured to divert a portion of a received optical beam to the tracking sensor and allow the remaining portion of the received optical beam to couple with the optical fiber. In some examples, the tracking sensor includes, but is not limited to, a position sensitive detector (PSD), a charge-coupled device (CCD) camera, a focal plane array, a photodetector, a quad-cell, or a CMOS sensor. The tracking sensor may detect a signal location at the tracking sensor and may convert the received optical beam into an electric signal using the photoelectric effect. The tracking sensor may track the received optical beam, which may be used to direct the steering mechanism 116 to counteract disturbances due to scintillation and/or platform motion.

The one or more processors 104 may be in communication with the steering mechanism 116 (such as a mirror or a gimbal) for adjusting the pointing direction of the transmitter 112, receiver 114, and/or optical beam. In particular, the steering mechanism 116 may be a MEMS 2-axis mirror, 2-axis voice coil mirror, or piezo electronic 2-axis mirror. The steering mechanism 116 may therefore be configured to steer the transmitter, receiver, and/or optical beam in at least two degrees of freedom, such as, for example, yaw and pitch. The adjustments to the pointing direction may be made to establish acquisition and connection link, such as communication link 22, between the first communication device 102 and the second communication device 122. In addition, the adjustments may optimize transmission of light from the transmitter and/or reception of light at the receiver. In some implementations, the one or more processors 104 may provide closed loop control for the steering mechanism 116 to adjust pointing direction based upon the optical beam received over the communication link from a transmitting communication device, such as an optical beam received over the communication link 22b from the second communication device 122.

Similarly, the second communication device 122 includes one or more processors, 124, a memory 126, a transmitter 132, and a receiver 134. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may be configured to output both an optical communication beam and a beacon beam. For example, transmitter 132 of the second communication device 122 may output a beacon beam 20b to establish a communication link 22*b* with the first communication device 102, which receives the beacon beam 20*b*. The second communication device 122 may align the beacon beam 20*b* co-linearly with the optical communication beam (not shown) that has a narrower solid angle than the beacon beam and carries another communication signal. As such, when the first communication device 102 receives the beacon beam 20*a*, the first communication device 102 may establish a line-of-sight with the second communication device 122 or otherwise align with the second communication device. As a result, the communication link 22*b*, that allows for the transmission of the optical communication beam (not shown) from the second communication device 122 to the first communication device 102, may be established.

Like the receiver 114, the receiver 134 may include a tracking sensor configured to detect the optical beam and an optical fiber with the same or similar features as described above with respect to the receiver 114. In addition, the receiver 134 may also include a lens, mirror, or other system configured to divert a portion of a received optical beam to the tracking sensor and allow the remaining portion of the received optical beam to couple with the optical fiber. The tracking sensor of receiver 134 may track the received optical beam, which may be used to direct the steering mechanism 136 to counteract disturbances due to scintillation and/or platform motion.

The one or more processors 124 may be in communication with the steering mechanism 136 (such as a mirror or a gimbal) for adjusting the pointing direction of the transmitter 132, receiver 134, and/or optical beam, as described above with respect to the steering mechanism 116. The adjustments to the pointing direction may be made to establish acquisition and connection link, such as communication link 22, between the first communication device 102 and the second communication device 122. In addition, the one or more processors 124 may provide closed loop control for the steering mechanism 136 to adjust pointing direction based upon the optical beam received over the communication link from a transmitting communication device, such as an optical beam received over the communication link 22*a* from the first communication device 102.

As shown in FIG. 1, the communication links 22*a* and 22*b* may be formed between the first communication device 102 and the second communication device 122 when the transmitters and receivers of the first and second communication devices are aligned. Using the communication link 22*a*, the one or more processors 104 can send communication signals to the second communication device 122. Using the communication link 22*b*, the one or more processors 124 can send communication signals to the first communication device 102. In some examples, it may be sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or other type of communication link capable of travelling through free space.

Figure 2:
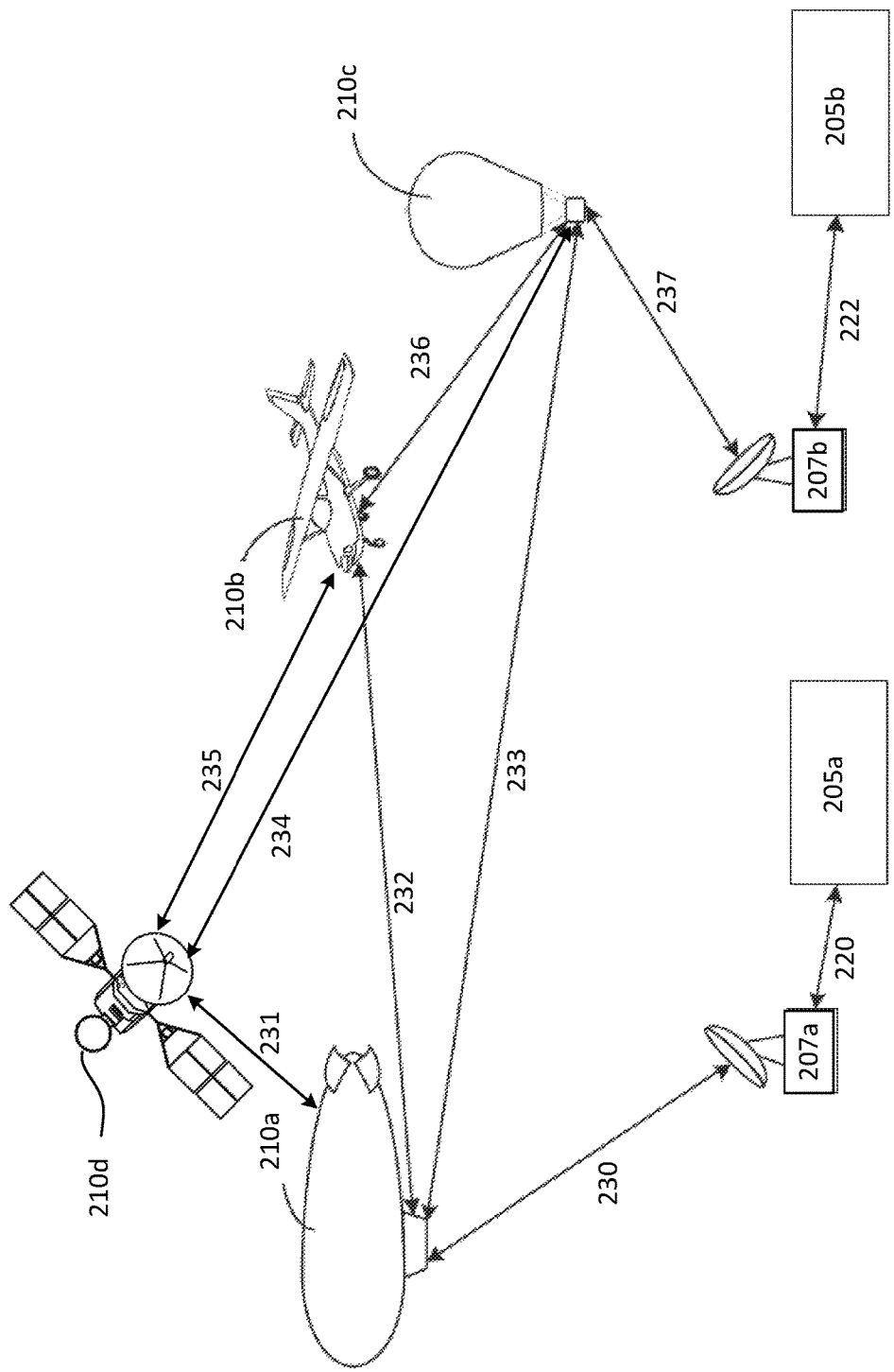
FIG. 2 is a pictorial diagram of a network 200 in accordance with aspects of the disclosure.

As shown in FIG. 2, a plurality of communication devices, such as the first communication device 102 and the second communication device 122, may be configured to form a plurality of communication links between a plurality of communication terminals and form a network 200. For example, the communication terminals in network 200 includes two land-based datacenters 205*a* and 205*b* (generally referred to as datacenters 205), two ground terminals, or ground stations, 207*a* and 207*b* (generally referred to as ground stations 207), and four airborne high altitude platforms (HAPs) 210*a*-210*d* (generally referred to as HAPs 210). As shown, HAP 210*a* is a blimp, HAP 210*b* is an airplane, HAP 210*c* is a balloon, and HAP 210*d* is a satellite. Arrows shown between a pair of communication terminals represent possible communication links 220, 222, 230-237 between the communication terminals.

The configuration of network 200 as shown in FIG. 2 is illustrative only, and in some implementations the network 200 may include additional or different communication terminals. For example, in some implementations, the network 200 may include additional HAPs, which may be balloons, blimps, airplanes, unmanned aerial vehicles (UAVs), satellites, or any other form of high altitude platform, additional ground communication terminals, or other types of communication terminals. In alternate implementations, the network 200 is a terrestrial network comprising a plurality of communication devices on a plurality of ground communication terminals. The network 200 may be an FSOC network that includes communication terminals having communication devices equipped to perform FSOC, such as the first communication device 102 and the second communication device 122. In other implementations, the network 200 may additionally or alternatively be equipped to perform other forms of communication, such as radiofrequency communications.

In some implementations, the network 200 may serve as an access network for client devices such as cellular phones, laptop computers, desktop computers, wearable devices, or tablet computers. The network 200 also may be connected to a larger network, such as the Internet, and may be configured to provide a client device with access to resources stored on or provided through the larger computer network. In some implementations, HAPs 210 can include wireless transceivers associated with a cellular or other mobile network, such as eNodeB base stations or other wireless access points, such as WiMAX or UMTS access points. Together, HAPs 210 may form all or part of a wireless access network. HAPs 210 may connect to the datacenters 205, for example, via backbone network links or transit networks operated by third parties. The datacenters 205 may include servers hosting applications that are accessed by remote users as well as systems that monitor or control the components of the network 200. HAPs 210 may provide wireless access for the users, and may route user requests to the datacenters 205 and return responses to the users via the backbone network links.

Example Methods

The communication devices may be used to perform a method for transferring state information in a beacon beam or a communication channel. As described above, state information of the first communication device 102 may be collected and monitored by one or more processors 104 of the first communication device. The state information may include, for example, a power level, pointing direction, geographic location, system requirements, or other type of information about the operation of the first communication device. The state information may be collected by, for example, receiving data from one or more components of a communication device, such as the transmitter or receiver, detecting or measuring physical characteristics of a communication device using one or more sensors, retrieving information from the memory, or other collection means. In one implementation, the state information may be transmitted with the beacon beam. In another implementation, the state information may be transmitted in an idle frame of the communication channel.

Figure 3:
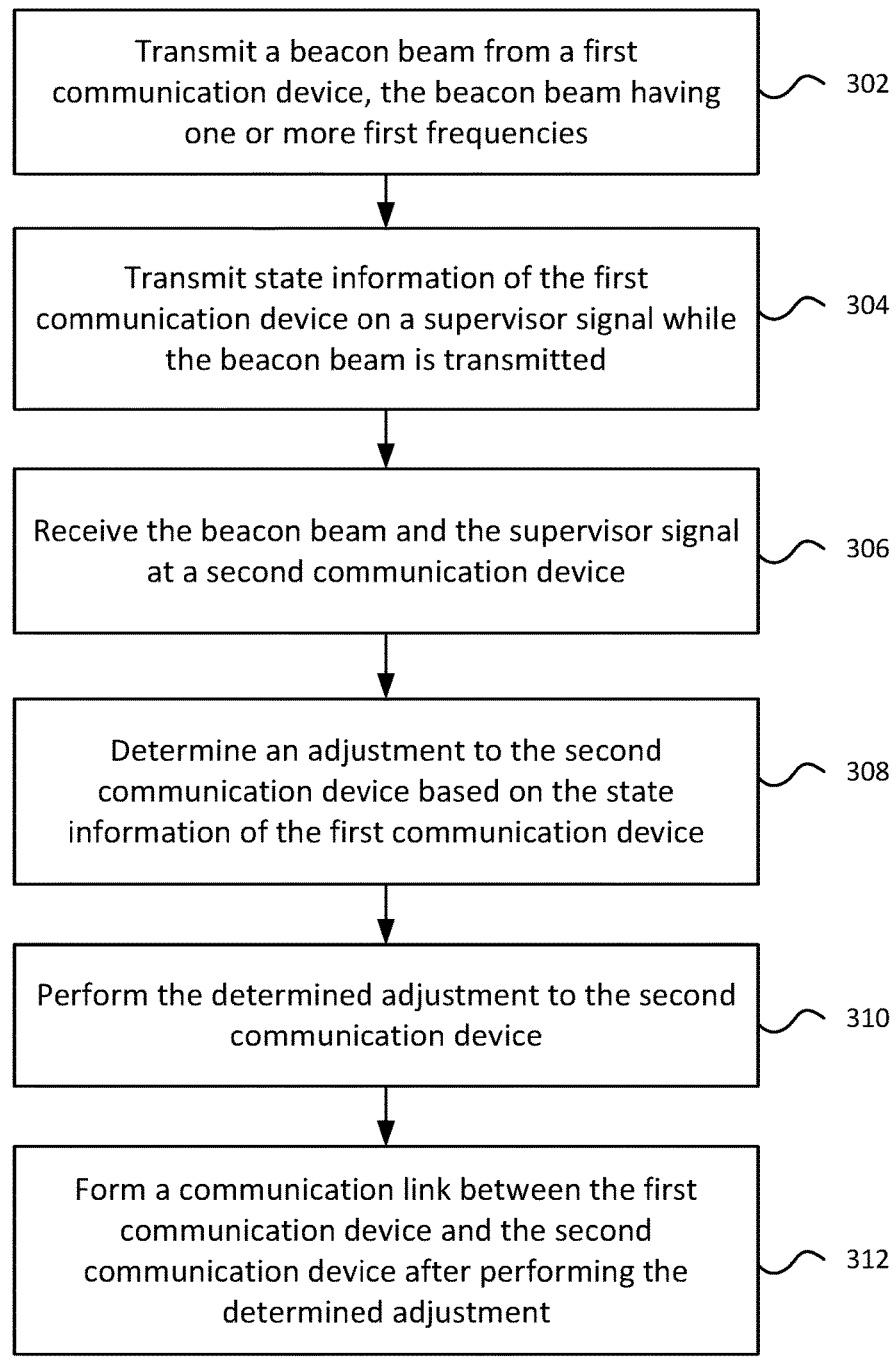
FIG. 3 is a flow diagram 300 in accordance with aspects of the disclosure.

In FIG. 3, flow diagram 300 is shown in accordance with some of the aspects described above that may be performed by the one or more processors 104 of the first communication device 102 and/or the one or more processors 124 of the second communication device 122. While FIG. 3 shows blocks in a particular order, the order may be varied and that multiple operations may be performed simultaneously. Also, operations may be added or omitted.

At block 302, one or more processors transmit a beacon beam from a first communication device, such as the one or more processors 104 and first communication device 102. The beacon beam may be transmitted using a transmitter of the first communication device and may have one or more first frequencies. The one or more first frequencies may be, for example 150 Hz or less. The beacon beam need not carry any encoded data.

At block 304, the one or more processors transmit state information of the first communication device while the beacon beam is transmitted. The state information may be transmitted in a supervisor signal having a second frequency. The second frequency may be different from the first frequency. For example, the second frequency may be greater than 150 Hz. The beacon beam and the supervisor signal may be transmitted using a same transmitter of the first communication device, such as a beacon transmitter.

At block 306, the beacon beam and the supervisor signal is received at a second communication device, such as second communication device 122. The second communication device may receive the beacon beam and the supervisor signal at a receiver, such as receiver 134, which couples at least a portion of the beacon beam and the supervisor signal onto an optical fiber of the second communication device.

At block 308, the one or more processors of the second communication device obtain the state information of the first communication device from the supervisor signal and use the state information to determine an adjustment to the second communication device based on the obtained state information. The adjustment may include, for example, an updated pointing direction of the second communication device based on a pointing direction and/or geographic location of the first communication device. The adjustment may alternatively or additionally include, in some examples, changing transmission specifications at the second communication device based on the system requirements of the first communication device or other information related to forming or operating a communication link between the first and second communication devices.

At block 310, the one or more processors of the second communication device performs the determined adjustment. Performing the determined adjustment may include moving the steering mechanism of the second communication device to the updated pointing direction or changing transmission specification of the transmitter of the second communication device. At block 312, after making the determined adjustment, a first communication link is formed between the first communication device and the second communication device. The first communication link may be transmitted using a communication link transmitter. In some examples, the first communication link may be one of a plurality of links forming a network, such a network 200. The first communication link may be used to transfer data from a source location to a destination location through the network, such as from ground station 207a to ground station 207b through network 200 or client devices in communication with the ground stations 207a, 207b. In some cases, the first communication link may be unidirectional, or configured to only transmit data from the first communication device to the second communication device or vice versa. In other cases, the first communication link may be bi-directional.

Optionally, the two communication devices may switch roles to communicate state information of the second communication device to the first communication device. Alternatively, both communication devices may simultaneously perform both transmitting and receiving of a beacon beam and state information. The first communication device may perform an adjustment to align with the second communication device in a same or similar way as described above. A second communication link may be formed and may be configured to transmit data in an opposite direction from the first communication link.

Figure 4:
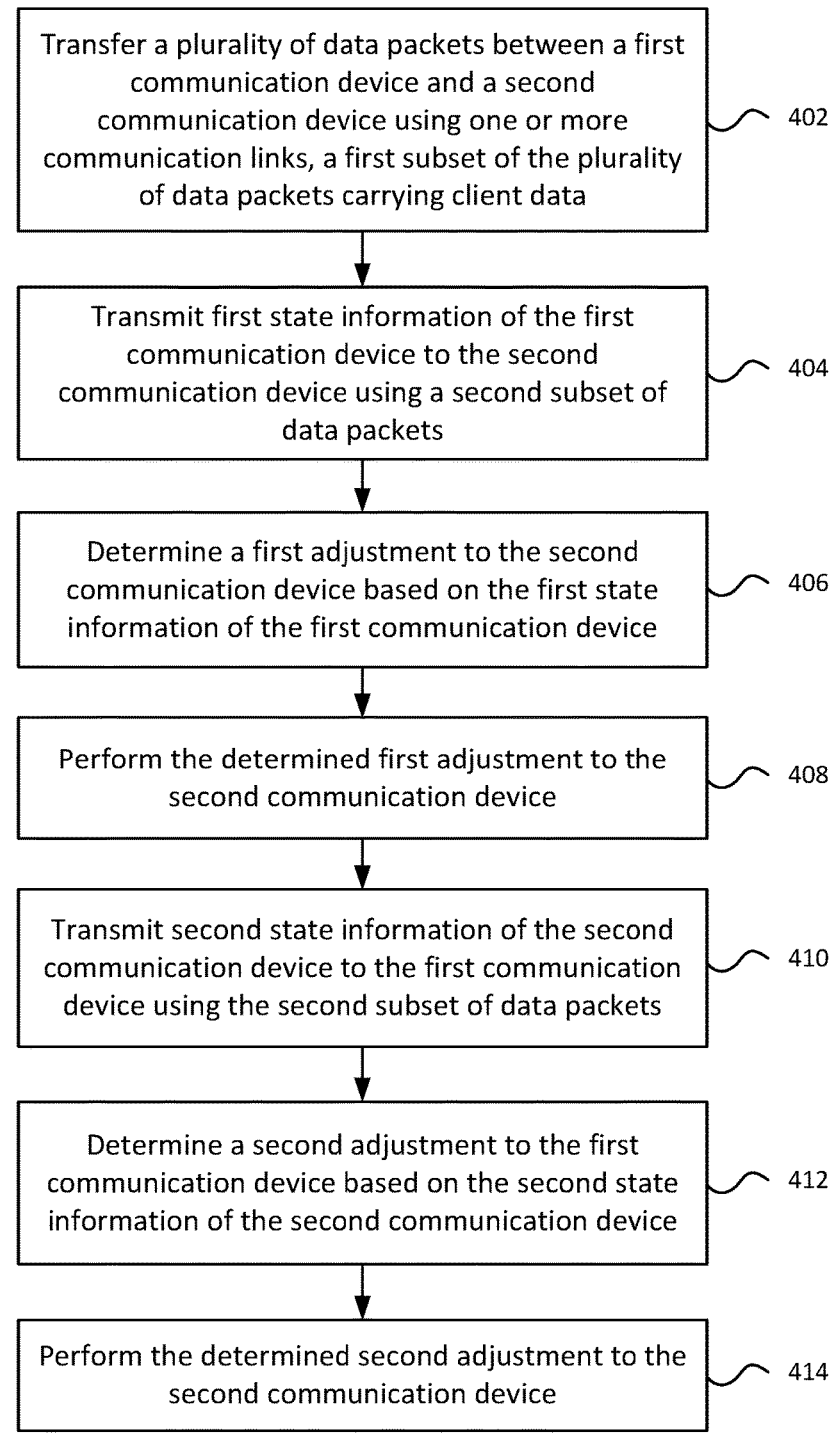
FIG. 4 is another flow diagram 400 in accordance with aspects of the disclosure.

In FIG. 4, flow diagram 400 is shown in accordance with some of the aspects described above that may be performed by the one or more processors 104 of the first communication device 102 and/or the one or more processors 124 of the second communication device 122. While FIG. 4 shows blocks in a particular order, the order may be varied and that multiple operations may be performed simultaneously. Also, operations may be added or omitted.

Once one or more communication links are established between two communication devices, one or more processors transfer data packets between the two communication devices via one or more optical beams at block 402. Each data packet may include a header or preamble and a payload. Client data may be transmitted in the payload of a first subset of data packets from a first communication device to a second communication device, such as from first communication device 102 to second communication device 122 or vice versa.

At block 404, one or more processors of the first communication device optically transmit state information of the first communication device to the second communication device via the payload of a second subset of data packets. The second subset of data packets may include one or more idle frames, such as one or more data packets that do not carry client data. At block 406, one or more processors of the second communication device obtain the state information of the first communication device from the idle frames and use the state information to determine an adjustment to the second communication device. The adjustments may be determined in a same or similar way as described above with respect to FIG. 3. At block 408, the one or more processors of the second communication device perform the determined adjustment. The determined adjustment may be performed in a same or similar way as described above with respect to FIG. 3.

Likewise, at block 410, state information of the second communication device is also optically transmitted to the first communication device in the one or more idle frames. At block 412, the one or more processors of the first communication device obtain the state information of the second communication device from the idle frames and use the state information to determine an adjustment to the first communication device. At block 414, the one or more processors of the first communication device perform an adjustment to align with the second communication device in a same or similar way as described above with respect to FIG. 3. Making the one or more adjustments may help to maintain or improve the one or more communication links between the first and second communication devices.

If the one or more communication links are lost, the first and second communication devices may switch back to transmitting state information on the supervisor signal with the beacon beam as described above with respect to FIG. 3.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of transmitting state information using free-space optical communication, the method comprising:
    collecting, using one or more processors of a first communication device, state information of the first communication device;
    transmitting, using a beacon transmitter of the first communication device, a beacon beam and a supervisor signal in a first solid angle, the beacon beam being one or more first frequencies and the supervisor signal being a second frequency different from the one or more first frequencies and carrying the state information; and
    when a communication link is established between the first communication device and a second communication device, transmitting, using a communication link transmitter of the first communication device, a plurality of data packets to the second communication device in a second solid angle smaller than the first solid angle, a first subset of the plurality of data packets carrying client data and a second subset of the plurality of data packets carrying the state information of the first communication device.

2. The method of claim 1, further comprising performing an adjustment of the second communication device using the state information of the first communication device.

3. The method of claim 2, wherein performing the adjustment of the second communication device includes updating a pointing direction of the second communication device based on a location or pointing direction included the state information of the first communication device.

4. The method of claim 2, wherein performing the adjustment of the second communication device includes updating transmission specifications based on system requirements included in the state information of the first communication device.

5. The method of claim 1, further comprising:
    receiving state information from the second communication device; and
    performing an adjustment of the first communication device using the state information of the second communication device.

6. The method of claim 1, wherein the one or more first frequencies are 150 Hz or less and the second frequency is greater than 150 Hz.

7. The method of claim 1, wherein the first solid angle covers an angular area on the order of a square milliradian, and the second solid angle covers an angular area on an order of one hundredth of a square milliradian.

8. The method of claim 1, further comprising, switching, by the one or more processors, to transmitting state information in the supervisor signal using the beacon transmitter when the communication link is lost.

9. A system for transmitting state information using free-space optical communication, the system comprising:
    a beacon transmitter configured to transmit a beacon beam including one or more first frequencies in a first solid angle;
    a communication link transmitter configured to transmit a plurality of data packets; and
    one or more processors configured to:
    collect state information of a first communication device;
    transmit, using the beacon transmitter, supervisor signal along with the beacon beam in the first solid angle, the supervisor signal being a second frequency different from the one or more first frequencies and carrying the state information; and
    when a communication link is established between the first communication device and a second communication device, transmit, using the communication link transmitter of the first communication device, the plurality of data packets to the second communication device in a second solid angle smaller than the first solid angle, a first subset of the plurality of data packets carrying client data and a second subset of the plurality of data packets carrying the state information of the first communication device.

10. The system of claim 9, wherein the one or more processors are further configured to perform an adjustment of the second communication device using the state information of the first communication device.

11. The system of claim 10, wherein the one or more processors are configured to perform the adjustment of the second communication device by updating a pointing direction of the second communication device based on a location or pointing direction included in the state information of the first communication device.

12. The system of claim 10, wherein the one or more processors are configured to perform the adjustment of the second communication device by updating transmission specifications based on system requirements included in the state information of the first communication device.

13. The system of claim 9, wherein the one or more processors are further configured to:
    receive state information from the second communication device; and
    perform an adjustment of the first communication device using the state information of the second communication device.

14. The system of claim 9, wherein the one or more processors are further configured to, when the communication link is lost, switch to transmitting the state information in the supervisor signal using the beacon transmitter.

15. A non-transitory, tangible computer-readable storage medium on which computer readable instructions of a program are stored, the instructions, when executed by one or more processors, cause the one or more processors to perform a method, the method comprising:
    collecting state information of a first communication device;
    transmitting, using a beacon transmitter of the first communication device, a beacon beam and a supervisor signal in a first solid angle, the beacon beam being one or more first frequencies and the supervisor signal being a second frequency different from the one or more first frequencies and carrying the state information; and when a communication link is established between the first communication device and a second communication device, transmitting, using a communication link transmitter of the first communication device, a plurality of data packets to the second communication device in a second solid angle smaller than the first solid angle, a first subset of the plurality of data packets carrying client data and a second subset of the plurality of data packets carrying the state information of the first communication device.

16. The medium of claim 15, wherein the method further comprises performing an adjustment of the second communication device using the state information of the first communication device.

17. The medium of claim 16, wherein the method further comprises performing the adjustment of the second communication device by updating a pointing direction of the second communication device based on a location or pointing direction included the state information of the first communication device.

18. The medium of claim 16, wherein the method further comprises performing the adjustment of the second communication device by updating transmission specifications based on system requirements included in the state information of the first communication device.

19. The medium of claim 15, wherein the method further comprises:
receiving state information from the second communication device; and
performing an adjustment of the first communication device using the state information of the second communication device.

20. The medium of claim 15, wherein the method further comprises switching to transmitting state information in the supervisor signal using the beacon transmitter when the communication link is lost.

* * * * *